US011921668B2

(12) United States Patent
Ouyang et al.

(10) Patent No.: US 11,921,668 B2
(45) Date of Patent: Mar. 5, 2024

(54) PROCESSOR ARRAY AND MULTIPLE-CORE PROCESSOR

(71) Applicant: Beijing Tsingmicro Intelligent Technology Co., Ltd., Beijing (CN)

(72) Inventors: Peng Ouyang, Beijing (CN); Guozhi Song, Beijing (CN)

(73) Assignee: BEIJING TSINGMICRO INTELLIGENT TECHNOLOGY CO., LTD., Beijing (CN)

( * ) Notice: Subject to any disclaimer, the term of this patent is extended or adjusted under 35 U.S.C. 154(b) by 347 days.

(21) Appl. No.: 17/376,273

(22) Filed: Jul. 15, 2021

(65) Prior Publication Data
US 2022/0100698 A1 Mar. 31, 2022

Related U.S. Application Data (63) Continuation of application No. PCT/CN2021/079110, filed on Mar. 4, 2021.

(30) Foreign Application Priority Data

Sep. 30, 2020 (CN) .......................... 202011063336.4

(51) Int. Cl.
*G06F 15/80* (2006.01)
*G06F 9/54* (2006.01)
(52) U.S. Cl.
CPC ................ *G06F 15/80* (2013.01); *G06F 9/54* (2013.01)
(58) Field of Classification Search
CPC ........ G06F 15/80; G06F 9/54; G06F 15/8023; G06F 9/5406
See application file for complete search history.

(56) References Cited

U.S. PATENT DOCUMENTS

| 4,215,401 A | * | 7/1980 | Holsztynski | ........ G06F 15/8023 382/307 |
| 8,341,381 B2 | * | 12/2012 | Pechanek | ............ G06F 9/30076 712/13 |

(Continued)

FOREIGN PATENT DOCUMENTS

| CN | 102799563 | 11/2012 |
| CN | 108053361 | 5/2018 |

OTHER PUBLICATIONS

WIPO, International Search Report and Written Opinion for PCT/CN2021/079110, dated Jun. 23, 2021.

*Primary Examiner* — Farley Abad
(74) *Attorney, Agent, or Firm* — Hodgson Russ LLP (57) ABSTRACT

The present disclosure provides a processor array and a multiple-core processor. The processor array includes a plurality of processing elements arranged in a two-dimensional array, a plurality of first load units correspondingly arranged and connected to the processing elements of the first edge row, respectively, a plurality of second load units correspondingly arranged and connected to the processing elements of the first edge column, respectively, a plurality of first store units correspondingly arranged and connected to the processing elements of the second edge column, respectively, a plurality of second store units correspondingly arranged and connected to the processing elements of the second edge row, respectively.

20 Claims, 6 Drawing Sheets

(56) References Cited

U.S. PATENT DOCUMENTS

| | | | |
|---|---|---|---|
| 2013/0054811 A1* | 2/2013 | Harrand | G06F 15/7825 709/226 |
| 2013/0089102 A1* | 4/2013 | Seo | G06F 9/44505 370/401 |
| 2018/0329863 A1* | 11/2018 | Khan | G06F 15/7867 |
| 2021/0390076 A1* | 12/2021 | Fang | G06F 13/1668 |

* cited by examiner

PROCESSOR ARRAY AND MULTIPLE-CORE PROCESSOR

CROSS-REFERENCE TO RELATED APPLICATION

This application is a continuation of International Application No. PCT/CN2021/079110, filed on Mar. 4, 2021, which claims priority to and benefits of Chinese Patent Application Serial No. 202011063336.4, filed on Sep. 30, 2020, the entire disclosures of which are incorporated by reference herein.

FIELD

The present disclosure relates to a field of multiple-core processor interconnections, and more particularly to a processor array and a multiple-core processor.

BACKGROUND

In order to meet requirements for high energy efficiency, reconfigurable computing has attracted more and more attentions of those skilled in the art. Unlike commonly-used processors, a reconfigurable computing processor has many reconfigurable PE units with different granularities therein. A large computing array is formed through an on-chip interconnection network, which may perform various types of logic and arithmetic operations in parallel. Due to the complex requirements of various applications, the interconnection area and power consumption of the existing multiple-core processors which are capable of achieving the PE interconnection solutions are large.

SUMMARY

An object of the present disclosure is to provide a processor array and a multiple-core processor.

In order to achieve the above-mentioned object, the technical solutions are as follows.

In a first aspect of the present disclosure, a processor array is provided. The processor array includes a plurality of processing elements arranged in a two-dimensional array, and the two-dimensional array includes a first edge row and a second edge row parallel to the first edge row, and a first edge column and a second edge column parallel to the first edge column. A first end of the first edge row and a first end of the first edge column have a first shared processing element, and a second end of the first edge row and a first end of the second edge column have a second shared processing element. A first end of the second edge row and a second end of the first edge column have a third shared processing element, and a second end of the second edge row and a second end of the second edge column have a fourth shared processing element. The processor array further includes: a plurality of first load units correspondingly arranged and connected to the processing elements of the first edge row, respectively; a plurality of second load units correspondingly arranged and connected to the processing elements of the first edge column, respectively; a plurality of first store units correspondingly arranged and connected to the processing elements of the second edge column, respectively; a plurality of second store units correspondingly arranged and connected to the processing elements of the second edge row, respectively.

In a second aspect of the present disclosure, a multiple-core processor including a processor array is provided. The processor array includes a plurality of processing elements arranged in a two-dimensional array, and the two-dimensional array includes a first edge row and a second edge row parallel to the first edge row, and a first edge column and a second edge column parallel to the first edge column. A first end of the first edge row and a first end of the first edge column have a first shared processing element, and a second end of the first edge row and a first end of the second edge column have a second shared processing element. A first end of the second edge row and a second end of the first edge column have a third shared processing element, and a second end of the second edge row and a second end of the second edge column have a fourth shared processing element. The processor array further includes: a plurality of first load units correspondingly arranged and connected to the processing elements of the first edge row, respectively; a plurality of second load units correspondingly arranged and connected to the processing elements of the first edge column, respectively; a plurality of first store units correspondingly arranged and connected to the processing elements of the second edge column, respectively; a plurality of second store units correspondingly arranged and connected to the processing elements of the second edge row, respectively.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure. The embodiments shall not be construed to limit the present disclosure.

An object of the present disclosure is to provide a processor array and a multiple-core processor, which are capable of providing an inter-core structure for the multiple-core processor array that may meet various application requirements, and also reducing interconnection area and power consumption.

The present disclosure provides in embodiments a processor array. The processor array includes a plurality of processing elements PE arranged in a two-dimensional array, which is referred as a multiple-core processor array. The multiple-core processor array includes a first edge row and a second edge row in parallel and located at two edges of the multiple-core processor. The multiple-core processor array includes a first edge column and a second edge column in parallel and located at two edges of the multiple-core processor.

A first end of the first edge row and a first end of the first edge column have a first shared processing element, and a second end of the first edge row and a first end of the second edge column have a second shared processing element. A first end of the second edge row and a second end of the first edge column have a third shared processing element, and a second end of the second edge row and a second end of the second edge column have a fourth shared processing element.

The multiple-core processor array further includes: a plurality of first load units, a plurality of second load units, a plurality of first store units and a plurality of second store units.

The plurality of the first load units are correspondingly arranged and connected to processing elements of the first edge row, respectively. The plurality of the first load units are correspondingly arranged in a direction away from the multiple-core processor array and correspondingly connected to the processing elements of the first edge row.

The plurality of the second load units are correspondingly arranged and connected to the processing elements of the first edge column, respectively. The plurality of the second load units are correspondingly arranged in the direction away from the multiple-core processor array and are correspondingly connected to the processing elements of the first edge column.

The plurality of the first store units are correspondingly arranged and connected to the processing elements of the second edge column, respectively. The plurality of the first store units are correspondingly arranged in the direction away from the multiple-core processor array and are correspondingly connected to the processing elements of the second edge column.

The plurality of the second store units are correspondingly arranged and connected to the processing elements of the second edge row, respectively. The plurality of the second store units are correspondingly arranged in the direction away from the multiple-core processor array and are correspondingly connected to the processing elements of the second edge row.

In one embodiment of the present disclosure, each of the plurality of the first load units is connected to each processing element of the first edge row.

In one embodiment of the present disclosure, the plurality of the first load units are respectively connected to the processing elements of the first edge column.

In one embodiment of the present disclosure, each of the plurality of the second load units is connected to each processing element of the first edge column.

In one embodiment of the present disclosure, the plurality of the second load units are respectively connected to the processing elements of the second edge row.

In one embodiment of the present disclosure, each of the plurality of the first store units is connected to each processing element of the second edge column.

In one embodiment of the present disclosure, the plurality of the first store units are respectively connected to the processing elements of the second edge row.

In one embodiment of the present disclosure, each of the plurality of the second store units is connected to each processing element of the second edge row.

In one embodiment of the present disclosure, the plurality of the second store units are respectively connected to the processing elements of the first edge column.

In one embodiment of the present disclosure, the two-dimensional array is an array of M rows and N columns, where M≥4, and N≥3.

In one embodiment of the present disclosure, internal processing elements are enclosed by the first edge row, the second edge row, the first edge column, and the second edge column, each of internal processing elements of a second row to a (M−2)th row is fan-out connected to adjacent eight processing elements and is fan-out connected to a processing element adjacent to one of the eight processing elements in a first predetermined direction. Each of internal processing elements of a (M−1)th row is fan-out connected to adjacent eight processing elements and is connected to a corresponding processing element of a first row in a second predetermined direction.

The present disclosure provides in embodiments a multiple-core processor, including the processor array of any of the above-mentioned embodiments.

The present disclosure provides a processor array (referred as a PE array (PEA)), which is configured to transmit data flow between PEs to realize parallel calculation of data flow graph (DFG) of PEA.

The interconnection structure of the present disclosure includes three interconnections. The first interconnection is an interconnection between the load units and the processing elements of the PEA. The load unit is configured to load data from a memory to the PEA, that is, data required for operation is provided to the PEA through the load unit. The second interconnection is an interconnection between one PE to another within the PEA. The third interconnection is an interconnection between the PEA and the store units. The store unit is configured to store data resulted from completion of the PEA operation into the memory, that is, result data is written back through the store unit.

The multiple-core processor array includes a load array, a store array, and a PEA. That is, it refers to a combination of a plurality of load units, a plurality of store units, and a plurality of PEs. The PEA is composed of M*N PE units, and M and N are the number of rows and columns of the array, respectively (where N≥3, M≥4).

The load array is composed of M+N load units which may be arranged vertically or horizontally along the PEA, and is generally located upstream of a data-driven flow.

The store array is composed of M+N-dimensional store units which may be arranged vertically or horizontally along the PEA, and is generally located downstream of the data-driven flow, for example is placed in any direction of up, down, left and right of the PEA.

Since the first load unit, the second load unit, the first store unit, and the second store unit are arranged on the periphery of the multiple-core processor array, In common algorithms of application scenarios such as image and voice, and other common algorithms, for example set algorithms of specific scenarios such as fir, iir, fft and beamforming, orientations and positions of the first load unit, the second load unit, the first store unit and the second store unit relative to the multiple-core processor array may be selected, and partial interconnections between the load unit and the processing element, between one processing element and another processing element, and between the processing element and the store unit may be realized. Compared with a full interconnection in the art, the interconnection area and the interconnection consumption are significantly reduced.

As shown in FIG. 1 to FIG. 4, arrangement structures of the load array, the store array, and the PEA are illustrated.

Figure 1:
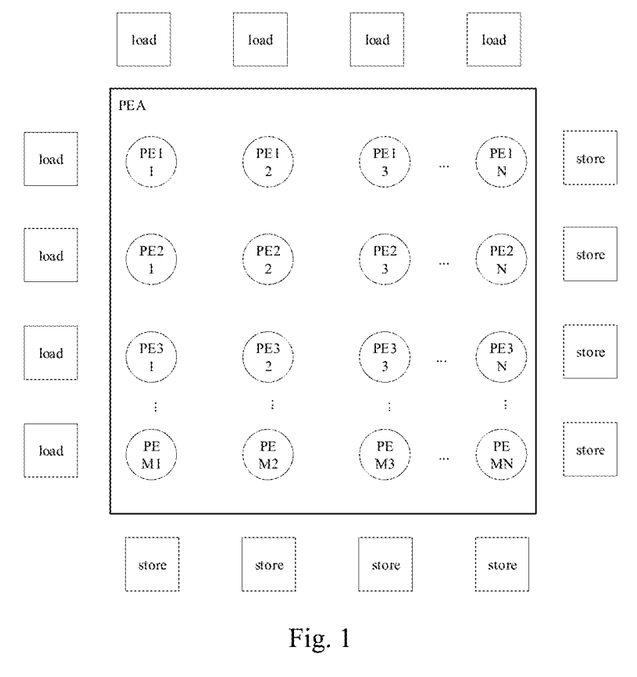
FIG. 1 is a schematic diagram showing a first arrangement structure of a load array, a store array, and a PEA according to an embodiment of the present disclosure.

In FIG. 1, the load array is located at the top left of the PEA, and the store array is located at the bottom right of the PEA.

Figure 2:
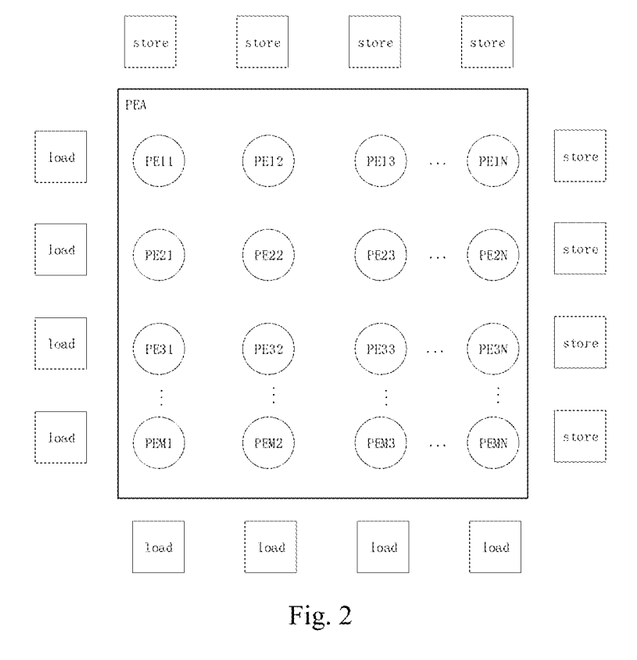
FIG. 2 is a schematic diagram showing a second arrangement structure of a load array, a store array and a PEA according to the embodiment of the present disclosure.

In FIG. 2, the load array is located at the bottom left of the PEA, and the store array is located at the top right of the PEA.

Figure 3:
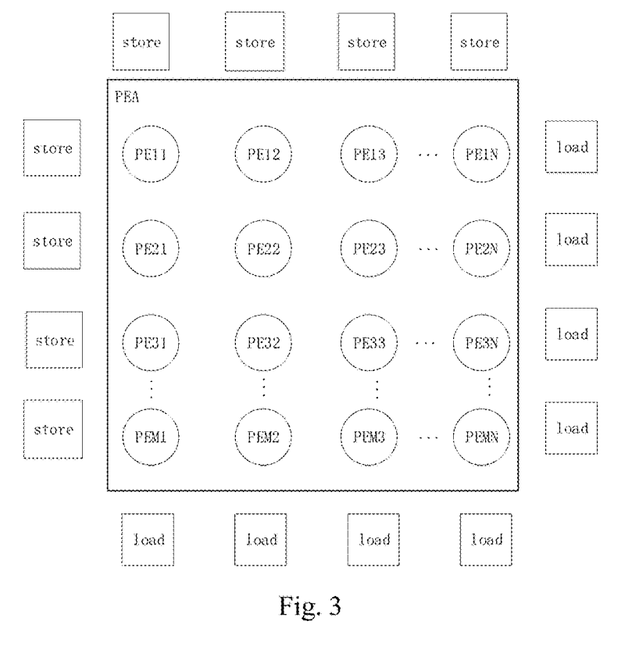
FIG. 3 is a schematic diagram showing a third arrangement structure of a load array, a store array and a PEA according to an embodiment of the present disclosure.

In FIG. 3, the load array is located at the bottom right of the PEA, and the store array is located at the top left of the PEA.

Figure 4:
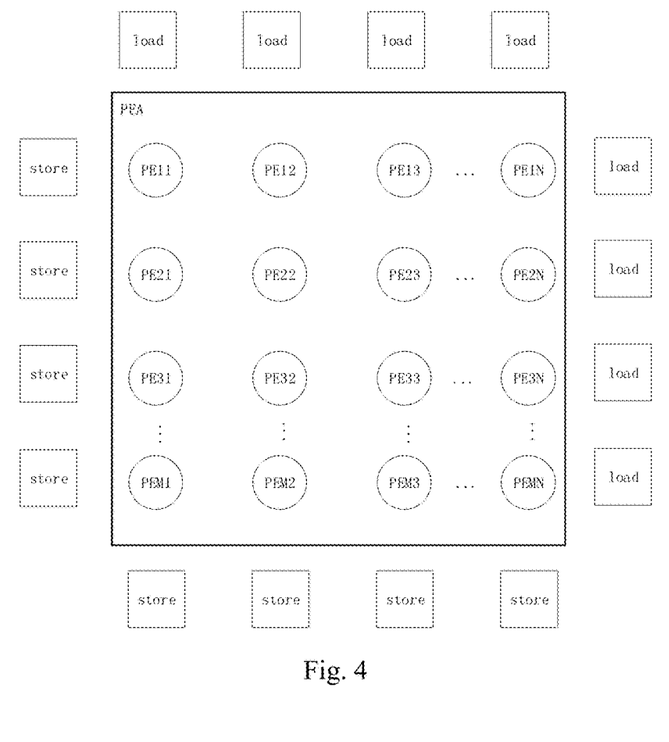
FIG. 4 is a schematic diagram showing a fourth arrangement structure of a load array, a store array and a PEA according to an embodiment of the present disclosure.

In FIG. 4, the load array is located at the top right of the PEA, and the store array is located at the bottom left of the PEA.

In an embodiment of the present disclosure, each of the plurality of the first load units is respectively connected to each processing element of the first edge column, to allow the plurality of the first load units to transmit their processing data to the processing elements of the first edge column. Alternatively, the plurality of the first load units are connected to each processing element of the second edge column, respectively, to allow the plurality of the first load units to transmit their processing data to the processing elements of the second edge column.

Each of the plurality of the second load units is respectively connected to each processing element of the first edge row, to allow the plurality of the second load units to transmit their processing data to the processing elements of the first edge row. Alternatively, each of the plurality of the second load units is respectively connected to each processing element of the second edge row, to allow the plurality of the second load units to transmit their processing data to the processing elements of the second edge row.

Each of the plurality of the first store units is respectively connected to each processing element of the first edge row, to allow each processing element of the first edge row to respectively transmit its processing data to the first store units. Alternatively, each of the plurality of the first store units is respectively connected to each processing element of the second edge row, to allow each processing element of the second edge row to respectively transmit its processing data to the first store units.

Each of the plurality of the second store units is respectively connected to each processing element of the first edge column, to allow each processing element of the first edge column to respectively transmit its processing data to the second store units. Alternatively, each of the plurality of the second store units is respectively connected to each processing element of the second edge column, to allow each processing element of the second edge column to respectively transmit its processing data to the second store units.

In another embodiment of the present disclosure, each of the plurality of the first load units is respectively connected to each processing element of the first edge row, to allow the plurality of the first load units to transmit their processing data to the processing elements of the first edge row.

Each of the plurality of the second load units is respectively connected to each processing element of the first edge column, to allow the plurality of the second load units to transmit their processing data to the processing elements of the first edge column.

Each of the plurality of the first store units is respectively connected to each processing element of the second edge row, to allow the processing element of the second edge row to respectively transmit its processing data to the plurality of the first store units.

Each of the plurality of the second store units is respectively connected to each processing element of the second edge column, to allow the processing element of the second edge column to respectively transmit its processing data to the plurality of the second store units.

Figure 5:
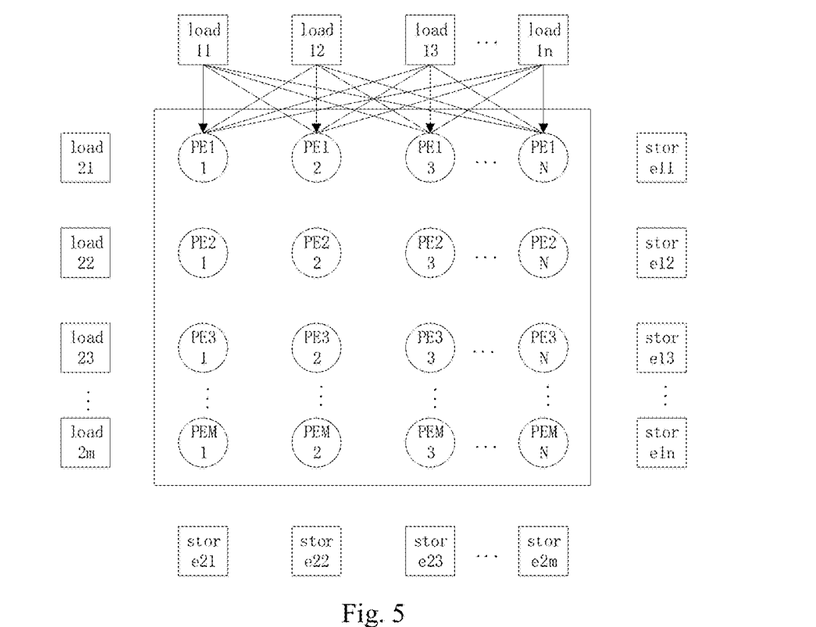
FIG. 5 is a schematic diagram showing a first interconnection between a first load unit and a PEA according to an embodiment of the present disclosure.

As shown in FIG. 5, an interconnection structure between first load units load 11 to load 1n and the PEA is described below. An interconnection structure between second load units load 21 to load 2m and the PEA may be known in the same way.

The first load units load 11 to load 1n may be interconnected with PEs of the first edge row of the PEA. Each of the first load units load 11 to load 1n is respectively connected to each processing element of the first edge row, such that the plurality of the first load units may transmit their processing data to the processing elements PE 11 to PE 1n of the first edge row.

Figure 6:
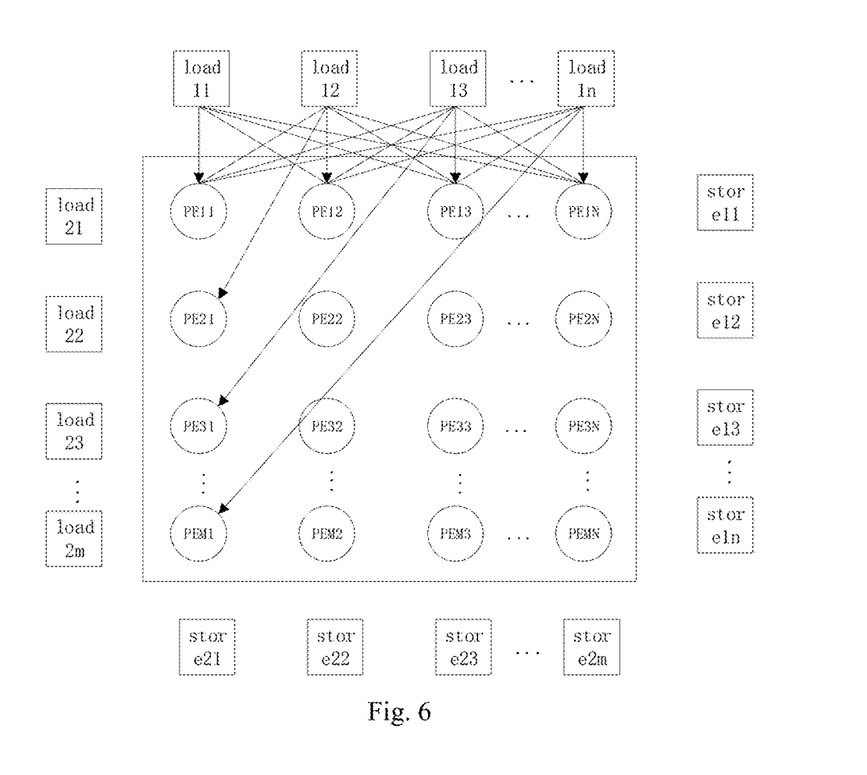
FIG. 6 is a schematic diagram showing a second interconnection between a first load unit and a PEA according to an embodiment of the present disclosure.

FIG. 6 shows a full interconnection between the first load units load 11 to load 1n and the PEs of the first edge row of the PEA, and a diagonal interconnection between the first load units load 11 to load 1n and PEs of the first edge column of the PEA.

Each of the first load units load 11 to load 1n is respectively connected to each processing element PE of the first edge row, that is, as shown in FIG. 6, the unit load 11 is connected to each of the processing elements PE 11 to PE 1n, respectively. The units load 12 to load 1n each are connected to the processing elements PE 11 to PE 1n in the same way.

One of the first load units load 11 to load 1n is correspondingly connected to one of the processing elements of the first edge column, respectively, that is, as shown in FIG. 6, the unit load 11 is connected to the processing element PE 11, the unit load 12 is connected to a processing element PE 21, and the unit load 13 is connected to a processing element PE 31, and so on.

Figure 7:
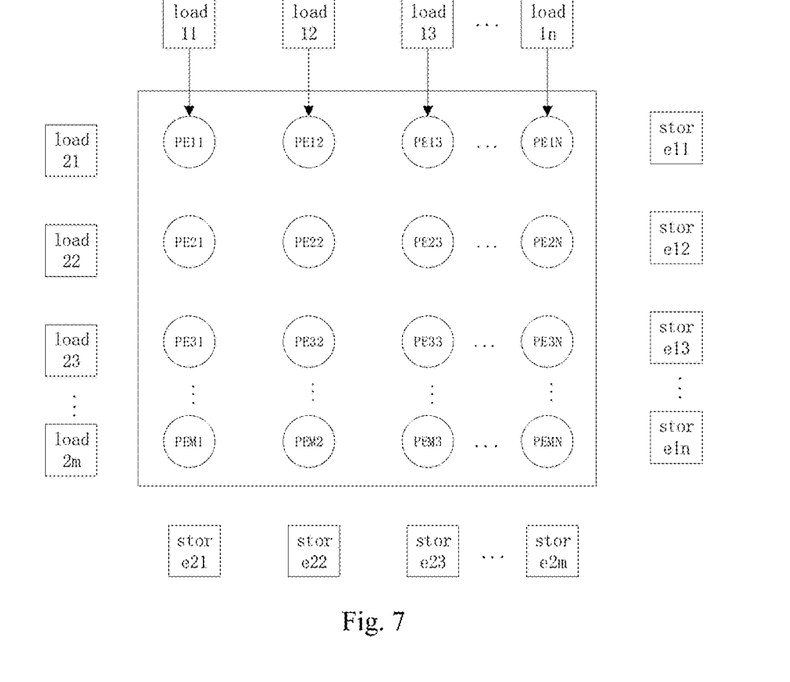
FIG. 7 is a schematic diagram showing a third interconnection between a first load unit and a PEA according to an embodiment of the present disclosure.

FIG. 7 shows an one-to-one interconnection between the first load units load 11 to load 1n and the PEs of the first edge row of the PEA, that is, the unit load 11 is connected to the processing element PE 11, the unit load 12 is connected to the processing element PE 12, and the unit load 13 is connected to the processing element PE 13, and so on.

Figure 8:
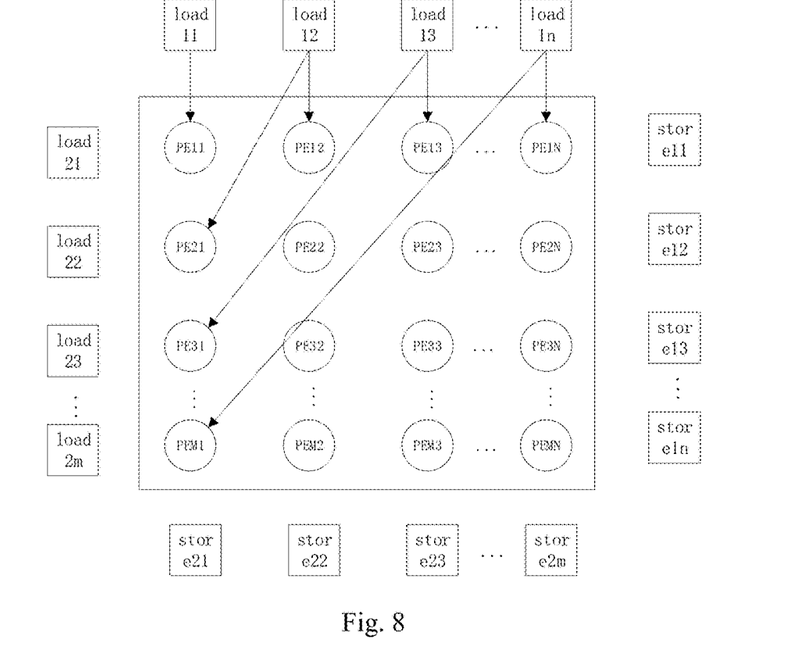
FIG. 8 is a schematic diagram showing a fourth interconnection between a first load unit and a PEA according to an embodiment of the present disclosure.

FIG. 8 shows the one-to-one interconnection between the first load units and the PEs of the first edge row of PEA, and a diagonal interconnection between the first load unit and the PEs of the first edge column. That is, the unit load 11 is connected with the processing element PE 11, the unit load 12 is connected with the processing element PE 12, and the unit load 13 is connected with the processing element PE 13, and so on. Furthermore, the unit load 12 is connected to the processing element PE 21, the unit load 12 is connected to the processing element PE 21, and the unit load 13 is connected to the processing element PE 31, and so on. On this basis, the one-to-one interconnection between the first load units and the PEs of the first edge row of the PEA, and the diagonal interconnection between the first load units and the PEs of the first edge column may be realized, such that the data flow graph is more flexibly mapped to the multiple-core processor of the present disclosure, thereby reducing a part of the interconnection consumption.

Figure 9:
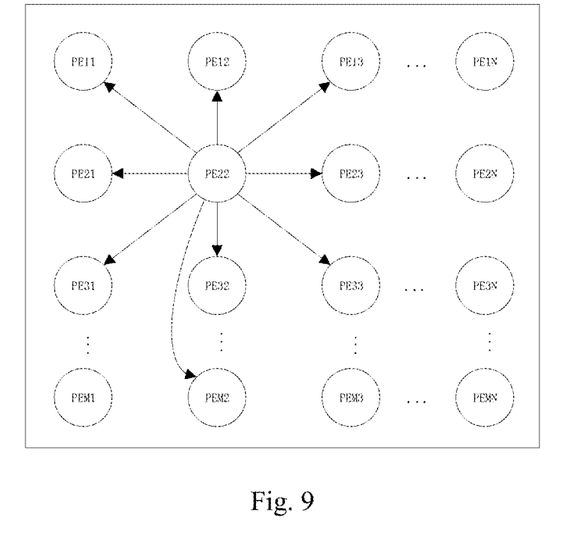
FIG. 9 is a schematic diagram showing an interconnection structure of interior PEs of a PEA according to an embodiment of the present disclosure.

FIG. 9 shows an internal interconnection of the PEA. The multiple-core processor array includes a plurality of internal processing elements except for the processing elements of the first edge row, the second edge row, the first edge column, and the second edge column. Among the plurality of the internal processing elements, an internal processing element, for example a processing element PE 22 may be considered as a center surrounded by other processing elements and connected to the processing elements around it.

The processor array further includes an interconnection between the processing element PE 22 and another processing element, for example a processing element PE M2, which is not the processing elements surrounding the center element PE 22.

Figure 10:
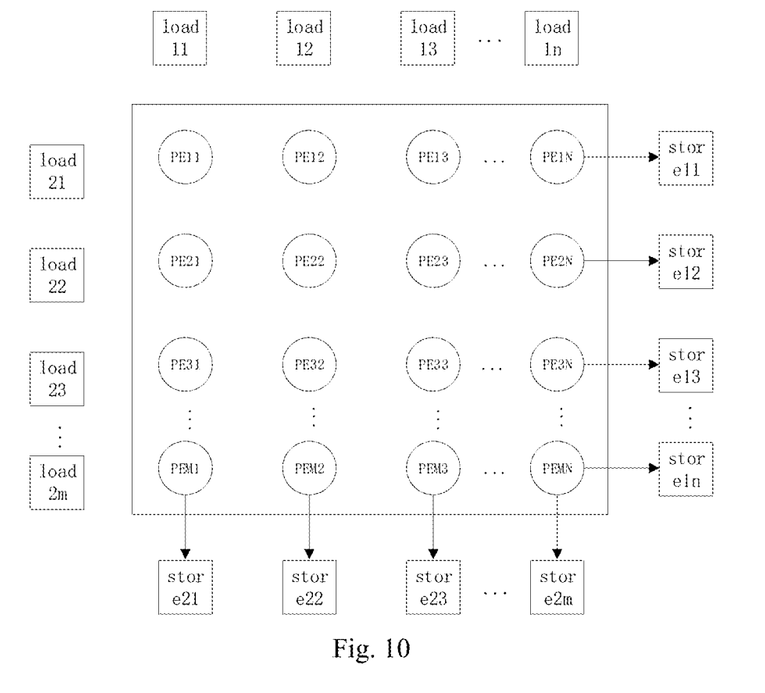
FIG. 10 is a schematic diagram showing an interconnection between a PEA and a store array according to an embodiment of the present disclosure.

FIG. 10 shows an interconnection structure of the PEA and the store array. The first store units are one-to-one interconnected with the PEs of the second edge row of the PEA, and the second store units are one-to-one interconnected with the PEs of the second edge row of the PEA.

That is, a unit store 11 is connected to an element PE 1n, a unit store 12 is connected to an element PE 2n, and a unit store 13 is connected to an element PE 3n, and so on. In addition, a unit store 21 is connected to an element PE M1, a unit store 22 is connected to an element PE M2, and a unit store 23 is connected to an element PE M3, and so on.

The present disclosure also provides in embodiments a multiple-core processor including the above-mentioned inter-core structure of the multiple-core processor array.

Figure 11:
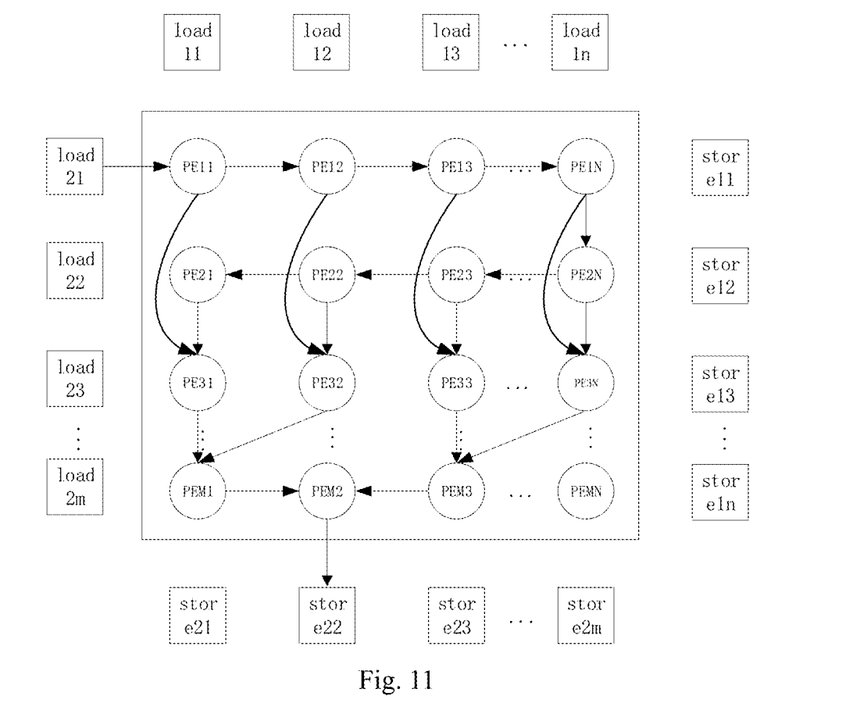
FIG. 11 is a schematic diagram showing an interconnection structure formed when a fir algorithm is mapped to a multiple-core processor according to an embodiment of the present disclosure.

FIG. 11 shows an example of an interconnection solution when an actual algorithm is mapped to the multiple-core processor pf the present disclosure.

In application scenarios such as image or voice, the common algorithms such as fir, iir, fft, beamforming, etc. may be used. For example, in order to meet requirements of the fir algorithm, specific orientations and positions of the load and store arrays may be determined according to the requirements of the fir algorithm, and a determined mapping scheme is shown in FIG. 11. In FIG. 11, the partial interconnection is realized between the load unit and the PE, between the PEs, and between the PE and the store unit. The unit load 21 is connected with the processor element PE 11, and the unit store 22 is connected with the processor element PE M2. Compared with a full interconnection, the partial interconnection structure shown in FIG. 11 may significantly reduce the interconnection consumption.

In the present disclosure, terms such as "first" and "second" are used herein for purposes of description and are not intended to indicate or imply relative importance or significance or to imply the number of indicated technical features. Thus, the feature defined with "first" and "second" may include one or more of this feature. In the description of the present invention, "a plurality of" means two or more than two, unless specified otherwise.

In the description of this specification, the reference term "an embodiment," "some embodiments," "an example," "a specific example," or "some examples," means that a particular feature, structure, material, or characteristic described in connection with the embodiment or example is included in at least one embodiment or example of the present disclosure. In this specification, the above-mentioned term in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, modifications, alternatives and variations can be made in the embodiments without departing from scope of the present disclosure.

What is claimed is:

1. A processor array, comprising:
a plurality of processing elements arranged in a two-dimensional array, wherein the two-dimensional array comprises a first edge row and a second edge row parallel to the first edge row, and a first edge column and a second edge column parallel to the first edge column;
wherein a first end of the first edge row and a first end of the first edge column have a first shared processing element, and a second end of the first edge row and a first end of the second edge column have a second shared processing element; and
wherein a first end of the second edge row and a second end of the first edge column have a third shared processing element, and a second end of the second edge row and a second end of the second edge column have a fourth shared processing element;
wherein the processor array further comprises:
a plurality of first load units correspondingly arranged and connected to processing elements of the first edge row, respectively, and the plurality of the first load units are respectively connected directly to the processing elements of the first edge column;
a plurality of second load units correspondingly arranged and connected to processing elements of the first edge column, respectively;
a plurality of first store units correspondingly arranged and connected to processing elements of the second edge column, respectively; and
a plurality of second store units correspondingly arranged and connected to processing elements of the second edge row, respectively.

2. The processor array of claim 1, wherein each of the plurality of the first load units is connected to each processing element of the first edge row.

3. The processor array of claim 2, wherein each of the plurality of the first load units is directly connected to each processing element of the first edge row.

4. The processor array of claim 1, wherein each of the plurality of the second load units is connected to each processing element of the first edge column.

5. The processor array of claim 1, wherein the plurality of the second load units are respectively connected to the processing elements of the second edge row.

6. The processor array of claim 1, wherein each of the plurality of the first store units is connected to each processing element of the second edge column.

7. The processor array of claim 1, wherein the plurality of the first store units are respectively connected to the processing elements of the second edge row.

8. The processor array of claim 1, wherein each of the plurality of the second store units is connected to each processing element of the second edge row.

9. The processor array of claim 1, wherein the plurality of the second store units are respectively connected to the processing elements of the first edge column.

10. The processor array of claim 1, wherein the two-dimensional array is an array of M rows and N columns, where M≥4, and N≥3.

11. The processor array of claim 10, wherein internal processing elements are enclosed by the first edge row, the second edge row, the first edge column, and the second edge column, each of internal processing elements of a second row to a (M-2)th row is fan-out connected to adjacent eight processing elements and is fan-out connected to a processing element adjacent to one of the eight processing elements in a first predetermined direction; each of internal processing elements of a (M-1)th row is fan-out connected to adjacent eight processing elements and is connected to a corresponding processing element of a first row in a second predetermined direction.

12. A multiple-core processor, comprising a processor array, the processor array comprising:
  a plurality of processing elements arranged in a two-dimensional array, wherein the two-dimensional array comprises a first edge row and a second edge row parallel to the first edge row, and a first edge column and a second edge column parallel to the first edge column;
  wherein a first end of the first edge row and a first end of the first edge column have a first shared processing element, and a second end of the first edge row and a first end of the second edge column have a second shared processing element; and
  wherein a first end of the second edge row and a second end of the first edge column have a third shared processing element, and a second end of the second edge row and a second end of the second edge column have a fourth shared processing element;
wherein the processor array further comprises:
  a plurality of first load units correspondingly arranged and connected to processing elements of the first edge row, respectively, and the plurality of the first load units are respectively connected directly to the processing elements of the first edge column;
  a plurality of second load units correspondingly arranged and connected to processing elements of the first edge column, respectively;
  a plurality of first store units correspondingly arranged and connected to processing elements of the second edge column, respectively; and
  a plurality of second store units correspondingly arranged and connected to processing elements of the second edge row, respectively.

13. The processor array of claim 12, wherein each of the plurality of the first load units is connected to each processing element of the first edge row.

14. The multiple-core processor of claim 13, wherein each of the plurality of the first load units is directly connected to each processing element of the first edge row.

15. The processor array of claim 12, wherein each of the plurality of the second load units is connected to each processing element of the first edge column.

16. The processor array of claim 12, wherein the plurality of the second load units are respectively connected to the processing elements of the second edge row.

17. The processor array of claim 12, wherein each of the plurality of the first store units is connected to each processing element of the second edge column.

18. The processor array of claim 12, wherein the plurality of the first store units are respectively connected to the processing elements of the second edge row.

19. The processor array of claim 12, wherein each of the plurality of the second store units is connected to each processing element of the second edge row.

20. The processor array of claim 12, wherein the plurality of the second store units are respectively connected to the processing elements of the first edge column.

* * * * *